United States Patent [19]

Plumeau

[11] 3,787,609

[45] Jan. 22, 1974

[54] ELECTRONIC COLOR FILTER SYSTEM

[75] Inventor: Charles A. Plumeau, Plano, Tex.

[73] Assignee: International Telephone and Telegraph Corporation, Nutley, N.J.

[22] Filed: June 13, 1972

[21] Appl. No.: 262,401

[52] U.S. Cl. .......... 178/5.4 ST
[51] Int. Cl. .......... H04n 9/06
[58] Field of Search .......... 178/5.4 R, 5.4 ST, 5.4 BD

[56] References Cited

UNITED STATES PATENTS

| | | | |
|---|---|---|---|
| 3,472,948 | 10/1969 | Hecker | 178/5.4 ST |
| 3,684,824 | 8/1972 | Koenig | 178/5.4 ST |

FOREIGN PATENTS OR APPLICATIONS

| | | | |
|---|---|---|---|
| 1,916,248 | 10/1969 | Germany | 178/5.4 BD |

*Primary Examiner*—Richard Murray
*Attorney, Agent, or Firm*—C. Cornell Remsen, Jr. et al.

[57] ABSTRACT

An image scanning system employs a solid state color filter providing a plurality of selectable discrete colors which are produced by voltage pulses of different amplitudes applied to the filter in a predetermined sequence. The filter is disposed on the faceplate of an image dissector tube which scans a scene and provides an output signal carrying the color information. A single camera tube with one electron multiplier can generate the three primary colors using a frame sequential, line-sequential, element-by-element or a random scanning system. The output signal may be transmitted to a receiver display tube having a like color filter with synchronized switching voltages or a standard three gun color cathode ray tube.

7 Claims, 4 Drawing Figures

ELECTRONIC COLOR FILTER SYSTEM

BACKGROUND OF THE INVENTION

1. FIELD OF THE INVENTION

This invention relates to image scanning systems for color displays and particularly to an improved image scanning tube arrangement employing a novel color filter which provides selective color information in accordance with the amplitude and sequence of the voltage pulses applied.

2. DESCRIPTION OF THE PRIOR ART

Present image scanning systems having a color display capability, such as used in television, generally employ a plurality of filters of the three different primary colors, red, green and blue, which are associated with respective image scanning tubes to separately and simultaneously scan a scene. The individual signals are then combined sequentially for transmission of the desired color signal. A particular relationship must be maintained between the various color signals to provide a proper sequence and avoid problems of misregistration. In a known variation of these systems, such as shown in U.S. Pat. No. 2,769,855, issued Nov. 6, 1956, a single filter having a plurality of different colored horizontal stripes is used in conjunction with a single image Orthicon type camera tube. A special indexing stripe is used to provide uniform spacing of the colors. The image is projected through the filter onto the photocathode of the tube and electrons from the photocathode strike a secondary emissive target which is charged in accordance with the image. An electron gun scanning beam successively scans the target line-by-line corresponding to each color stripe and a return beam is modulated by the image information. An apertured signal plate and multiplier arrangement then provide an output signal having the three color components. The sequential color signals may then be separated and transmitted in any desired manner such as by a simultaneous type system or using field, line or dot sequential types. Other known systems in the past have employed mechanically rotating synchronized color filters at the transmitting and receiving ends which were quite cumbersome and had practical size limitations.

Another simplified variation of a color imaging system is described in U.S. Pat. No. 3,684,824 issued Aug. 15, 1972, and assigned to the same assignee as the instant application. In this latter case, an image dissector tube is employed with three color filter strips over the faceplate to provide three color images. The images are simultaneously scanned over three separate apertures of a scanning plate having three separate electron multipliers, each associated with a respective strip. The output signals may again be combined in any desired manner for transmission. This system however has a size disadvantage in employing a scanning tube having three separate multiplier sections.

More recently, a color filter has been developed which has a plurality of color elements in a thin plate of lead zirconate-titanate ferroelectric ceramic material. The colors are selectable by application of different amplitude voltage pulses between electrodes on opposite sides of the plate. This device is more fully described in the publications "Product Engineering" dated Dec. 2, 1968, pages 36 and 37; and "Electronic Design," Nov. 21, 1968, page 28.

SUMMARY OF THE INVENTION

It is therefore the primary object of the present invention to provide a simplified versatile color image scanning system using an image dissector tube of reduced size having only one scanning aperture and electron multiplier section in conjunction with one filter which is capable of providing a plurality of selectable colors.

A further object is to employ a modified solid state lead zirconate-titanate ferroelectric ceramic filter providing a plurality of selectable colors for use with an image dissector tube having a single scanning aperture and electron multiplier which avoids problems of color registration. The device may also be used in several different sequential scanning modes.

The novel color image scanning system is achieved by use of a thin solid state filter plate or strip of lead zirconate-titanate ferroelectric ceramic material having a plurality of color elements in a matrix. The colors are selectable by applying particular amplitude voltage pulses across the elements between transparent electrodes on opposite sides of the plate. A suitable source of pulses is used to apply the proper voltages and sequence to provide the desired color information. The filter is positioned over the faceplate of an image dissector tube to provide radiation images of desired colors to the photocathode which emits electrons in response thereto. The electrons from successive portions of the photocathode are then scanned over a single aperture of a single electron multiplier structure to provide color image signals in frame sequential, line-sequential, dot-by-dot or random modes. Other objects and advantages will become apparent from the following description taken in conjunction with the accompanying drawings.

DESCRIPTION OF THE PREFERRED EMBODIMENTS

Figures 1, 2, 3, 4:
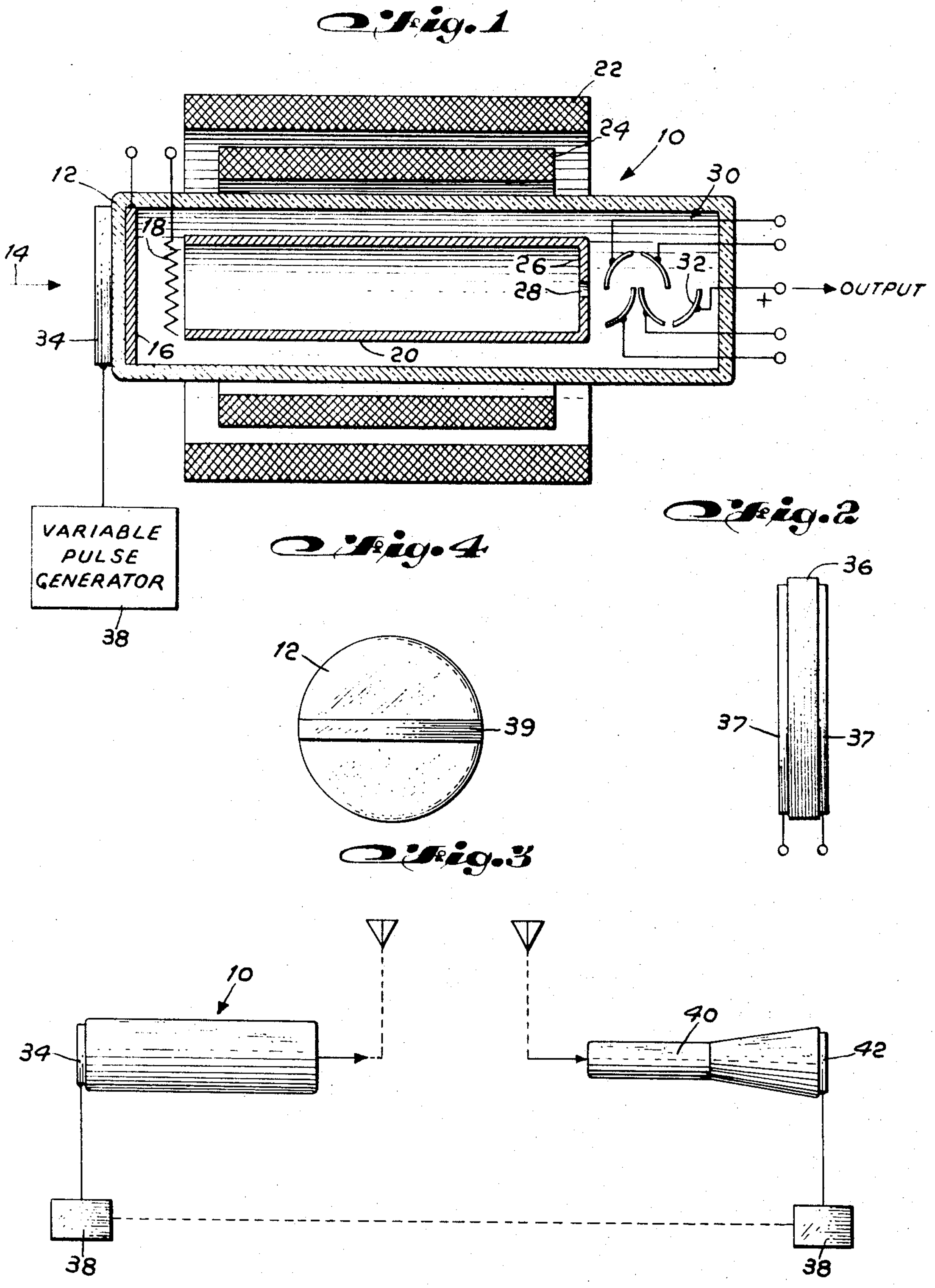
FIG. 1 is a schematic view of an image dissector scanning tube arrangement employing the selectable color filter.
FIG. 2 is a view of the ceramic filter showing the electrodes on opposite sides.
FIG. 3 shows a block diagram of a color image transmission system employing the novel image dissector color filter arrangement.
FIG. 4 shows a thin elongated color filter strip used in conjunction with a line scanning image dissector to provide a plurality of colors.

As shown in FIG. 1, an image dissector tube of the type described in U.S. Pat. No. 3,295,010, issued Dec. 27, 1966 and assigned to the same assignee as the instant application, includes a faceplate 12 at one end which admits light radiation 14 from a scene to be scanned. A photocathode 16 on the inner surface of the faceplate emits electrons in response to the radiation image pattern. The electrons are accelerated by an accelerating mesh grid 18 into a unipotential electrostatic field free cylindrical electrode 20 where they are electromagnetically focused and deflected by coils 22, 24 respectively, to scan an apertured plate 26. The electrons from each elementary horizontal portion of the photocathode are scanned successively line-by-line transversely across the aperture 28 which analyzes the image in a sequential manner. Electrons modulated by the image information are directed through the aperture into an electron multiplier 30 having successive secondary emissive dynodes which provide an amplified signal at output electrode 32. A suitable direct voltage source applies stepped potentials between the various electrodes to provide electron flow from the input to output ends.

A color filter 34 is disposed on the faceplate 12 in the path of radiation 14 to apply an image of a selective color pattern to the photocathode. This filter is a solid state plate of lead zirconate-titanate ferroelectric ceramic material having a plurality of color elements 36 in a matrix and transparent electrodes 37 on opposite sides, such as shown in more detail in FIG. 2.

The colors are selectable by applying particular amplitude voltage pulses across opposite sides of the plate to activate the color elements. For example, a 90 volt pulse activates a green color, while 60 and 30 volt pulses applied to the same material activate blue and red colors, respectively. The selected color remains until a new pulse is applied. Continuous transparent metallic electrodes are deposited on opposite sides of the plate to provide contacts to the color elements. The pulses of selected amplitudes are applied by a variable pulse generator 38 in a predetermined sequence to establish the desired color response of each element.

Various image scanning systems may be employed to provide different types of desired outputs. For example, the dissector may scan the color filter in a line-by-line system wherein the entire filter is instantaneously provided with one color for each line scan and is switched for successively scanned lines in a particular repetitive order, such as blue, green and red. The single dissector will then provide sequential output pulses of blue, green and red signals which are combined in the output for transmission. Another arrangement includes a frame sequential system wherein the filter retains one color for one full scanning frame and is then switched to a second color for the successive frame. In a further variation the filter voltage is switched very rapidly between the three successive colors as each elemental area of a line is scanned. This provides a dot sequential system.

Since only one tube is utilized, there is no color registration problem. As shown in FIG. 3, this signal may be transmitted for display on a kinescope television receiver cathode ray tube 40. A second color filter 42, having color pulses and switching synchronized with the first image sensing tube color filter, may be positioned over the face of the receiver tube to reproduce the original scene. The transmitted color signal having the three color information may also be applied to a three gun cathode ray tube for use in standard color television receivers. The color information may also be transmitted on a random or sampled dot-by-dot basis if the receiver filter is synchronized to have the same instantaneous random pattern and sufficient color switching speeds are provided.

In a line scanning system such as described in the above mentioned U.S. application, wherein a moving vehicle provides the motion for scanning a scene along the path of the vehicle, the vertical deflection scanning coils may be eliminated. The color filter can then be reduced to a long thin horizontal strip 39 disposed on the faceplate 12 of the image dissector tube for scanning in only one dimension. In this case only one such multicolor filter strip is sufficient to provide all the required color information by synchronizing the switching of the colors with successive line scans of the dissector tube. Thus, the same strip will be blue during the first scan, green during the next and then red, with the same pattern continuing to provide the composite sequential line signals. The various scanning patterns described above may likewise be employed using the same filter strip. An extended filter plate may also be used in this manner with scanning applied along only one horizontal area of the plate.

The present invention thus provides a novel versatile simplified color image scanning system employing only one selectable color filter with one image dissector tube having a single electron multiplier section to provide an improved multi-color display system which avoids color registration problems. While several embodiments of the system have been described and illustrated, it is apparent that many other variations may be made in particular design and configuration without departing from the scope of the invention as set forth in the appended claims.

What is claimed is:

1. An image scanning system comprising:
an image dissector tube having a faceplate at one end for receiving a radiation image,
a radiation responsive electron emissive photocathode on the inner surface of said faceplate,
an apertured electrode at the other end having only one scanning aperture for receiving electrons and one electron multiplier positioned adjacent said aperture,
means for directing and focusing electrons from said photocathode onto said apertured electrode,
means for repetitively scanning a transverse portion of said photocathode over said aperture of said electrode,
a color filter adjacent said faceplate in the path of said radiation image, said filter including a plurality of voltage responsive ferroelectric color elements producing selective colors in accordance with pulses of predetermined voltage amplitudes applied thereto, a pair of transparent electrodes on opposite sides of said filter, and
means for applying pulses of selected voltage amplitudes in a predetermined sequence to said filter electrodes, said filter directing radiation images of said selective colors onto said transverse portion of said photocathode, said electron multiplier providing an output signal modulated in accordance with said radiation images of selective colors.

2. The system of claim 1 wherein said filter is a thin horizontal strip positioned on said faceplate over said portion of said photocathode, said scanning means successively scanning said photocathode portion.

3. The system of claim 2 wherein said means for applying pulses to said filter instantaneously applies the same pulse amplitude to the entire filter to produce one color across said strip for each successive scanning, said pulses and color changing in a predetermined sequential pattern.

4. The system of claim 1 wherein said filter covers an extended vertical portion of said faceplate, said means for applying pulses applies different successive pulses to said filter to produce different respective colors in a repetitive sequential pattern, and said scanning means includes means for vertically scanning successive transverse portions of said photocathode in synchronism with said successive pulses of different colors.

5. The system of claim 1 including means for transmitting said output signal, means for receiving said signal, and means for displaying said received signal, said display means including a second color filter and second means for applying pulses to said second color filter in synchronism with said first color filter and the first pulse applying means to apply the same selected voltages for displaying the same color images.

6. The system of claim 1 wherein said filter is a thin plate of ferroelectric lead zirconate-titanate ceramic.

7. The system of claim 1 wherein said means for applying pulses to said filter applies a plurality of different successive instantaneous pulse amplitudes during the scanning of each elemental area of said photocathode.

* * * * *